United States Patent [19]

Coussell et al.

[11] 3,717,815

[45] Feb. 20, 1973

[54] INTERMITTENT CARRIER TRANSMITTER CHANGEOVER SYSTEM

[75] Inventors: Ivan John Coussell; Roy Pattison, both of Cambridge, England

[73] Assignee: Pye Limited, Cambridge, England

[22] Filed: Oct. 12, 1970

[21] Appl. No.: 80,012

[30] Foreign Application Priority Data

Sept. 18, 1969 Great Britain....................46,050/69

[52] U.S. Cl. ..................325/158, 325/161, 325/166, 325/168, 325/169, 325/186, 325/187, 328/70, 328/73

[51] Int. Cl. ..............................................H04b 1/04

[58] Field of Search......................325/156–158, 161, 325/162, 164, 166, 168, 169, 186, 187; 328/70, 73

[56] References Cited

UNITED STATES PATENTS 3,363,181 1/1968 Haywood et al......................325/158
2,806,944 9/1957 Sheffield et al......................325/158

*Primary Examiner*—Albert J. Mayer
*Attorney*—Frank R. Trifari

[57] ABSTRACT

A first memory circuit can be set to a state representing failure of a first transmitter. It remains so set when the first transmitter is keyed off. A second memory circuit is settable by the output of a second power monitor circuit when a second transmitter is keyed on. When set to a condition representing failure of the second transmitter it remains so set when the second transmitter is keyed off. A control circuit supplies control signals to first and second gate circuits, such that initially either the first gate circuit or the second gate circuit may be selected to permit a keying signal to reach the corresponding transmitter. The selection is reversed in the event of the memory unit corresponding to the initially selected transmitter is set to the condition representing failure of that transmitter.

4 Claims, 2 Drawing Figures

INTERMITTENT CARRIER TRANSMITTER CHANGEOVER SYSTEM

Figure 1:
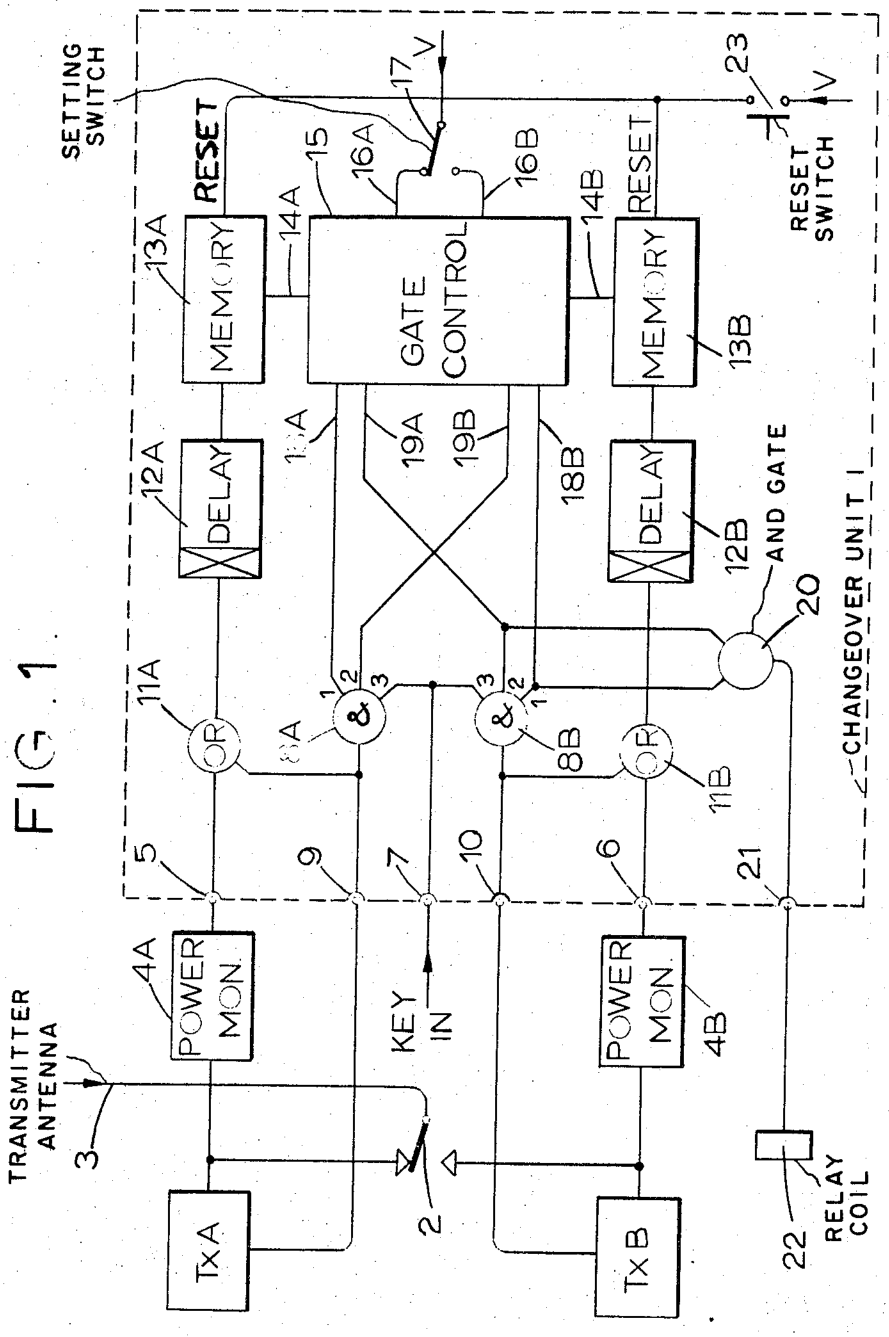

In continuous carrier transmission systems in which a signal is radiated at all times, it is common practice to provide two transmitters. Means are provided for selecting either one as main transmitter, the non-selected transmitter serving as a stand-by. In the event of the RF power output of the main transmitter falling below a preset level, the main transmitter is automatically shut down and the stand-by transmitter brought into operation. Commonly the arrangement includes means for controlling an aerial changeover relay, and for giving a first, non-urgent alarm on the failure of the selected main transmitter and a second, urgent alarm if both main and stand-by transmitters fail.

In intermittent carrier systems, a signal is provided to key on the transmitter when and only when information is to be transmitted. At all other times the transmitter is keyed off and does not provide any RF power output.

A changeover system of the type customary with continuous carrier is unsuitable for use with an intermittent carrier, since the absence of RF power when the transmitter is keyed off would be interpreted as failure of the transmitter.

According to the present invention in an intermittent carrier system, there are provided a first transmitter having a first RF power monitor means associated therewith, a second transmitter having a second RF power monitor associated therewith, a first gate circuit for directing a keying signal to the first transmitter, a second gate for directing the keying signal to the second transmitter, a first memory circuit settable by the output of the first power monitor only when the first transmitter is keyed on and characterized in that when set to a condition representing failure of the first transmitter it remains so set when the first transmitter is keyed off, a second memory circuit settable by the output of the second power monitor circuit when the second transmitter is keyed on, and characterized in that when set to a condition representing failure of the second transmitter it remains so set when the second transmitter is keyed off, and a control circuit for supplying controlling signals to the first and second gate circuits, such that initially either the first gate circuit or the second gate circuit may be selected to permit a keying signal to reach the corresponding transmitter, the selection being reversed in the event of the memory unit corresponding to the initially selected transmitter being set to the condition representing failure of that transmitter.

The invention may further comprise means for actuating an aerial changeover relay in accordance with signals supplied by the control circuit so as to couple a transmitting aerial to that transmitter currently in service. Further features of the invention comprise means for providing alarm signals in the event of failure of the main transmitter and of failure of both transmitters.

Figure 2:
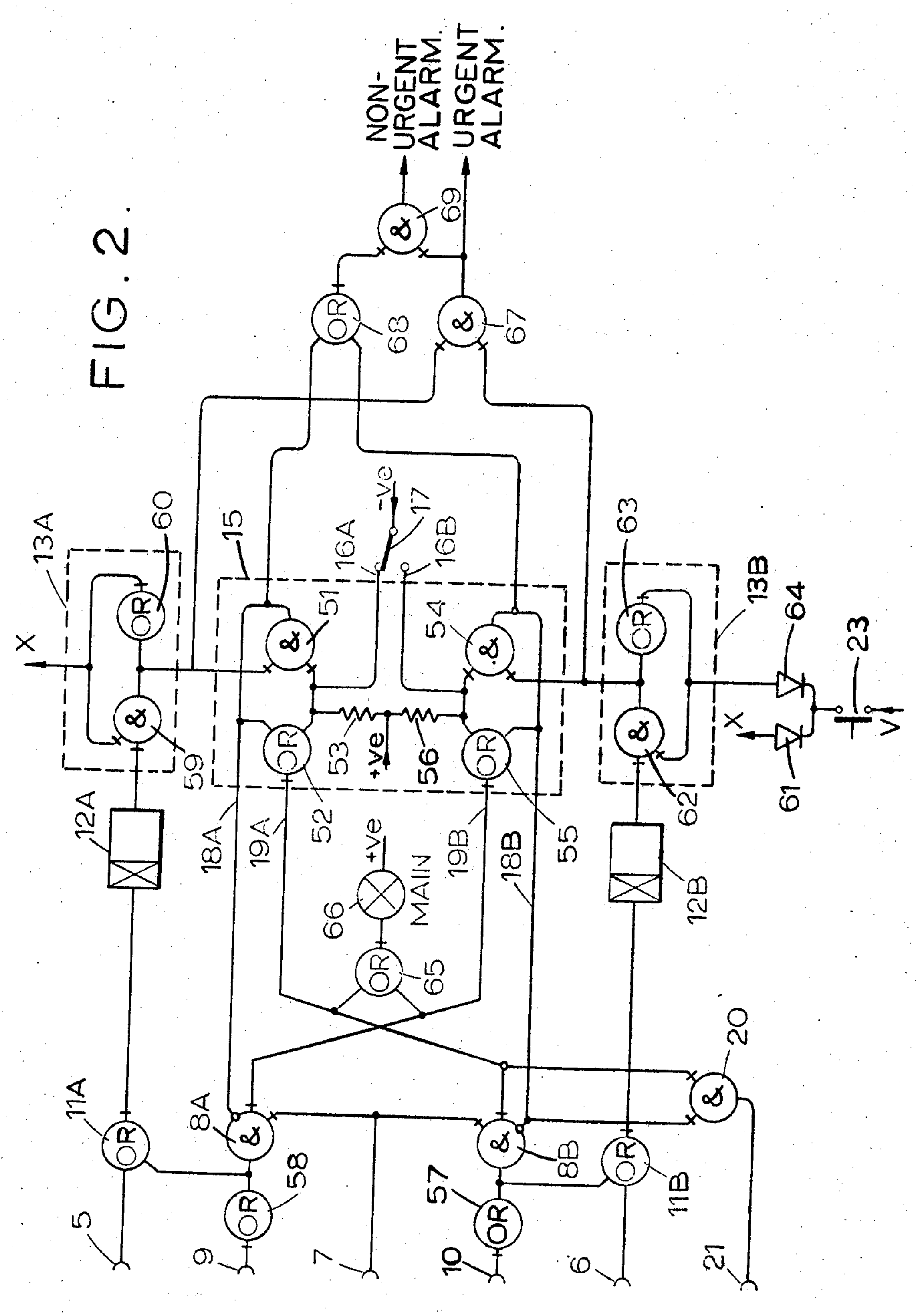

In order that the nature of the invention may be more clearly understood, an embodiment will be described, by way of example, with reference to the drawings accompanying the provisional specification, in which:

FIG. 1 shows a block schematic diagram of a transmission system incorporating the invention, FIG. 2 shows in more detail the changeover unit of FIG. 1.

Referring first to FIG. 1, transmitters TxA and TxB have their RF outputs connected respectively to the normally closed and normally open contacts of an aerial changeover relay 2. The moving contact of relay 2 is connected to the transmitting aerial 3. The input of a power monitor unit 4A is connected to the RF output of TxA and that of a power monitor unit 4B to the output of TxB. The output of monitor 4A is connected to terminal 5 of a changeover unit shown generally in dotted rectangle 1, and the output of monitor 4B is connected to terminal 6 of unit 1.

In unit 1, a keying input terminal 7 is connected to the third inputs of a pair of three-input AND gates 8A and 8B. The output of gate 8A is connected via terminal 9 to the keying signal input of TxA, and the output of gate 8B is connected via terminal 10 to the keying signal input of TxB. The output of 8A is also connected to one input of a two-input OR gate 11A. The second input of 11A is connected to terminal 5, and the output of OR gate 11A is connected, via a delay unit 12A, to the SET input of a memory unit 13A. Similarly, the output of gate 8B is connected to an input of a two-input OR gate 11B, which has its second input connected to terminal 6, and its output connected via a delay unit 12B to the SET input of a memory unit 13B.

The outputs of units 13A and 13B are connected to inputs 14A and 14B respectively of a control gate unit 15. A switch 17 applies a d.c. potential to one or other of further inputs 16A and 16B of unit 15.

Unit 15 provides a first pair of outputs, 18A and 18B, and a second pair 19A and 19B. 18A and 18B are connected respectively to the first inputs of gates 8A and 8B, while outputs 19B and 19A are connected respectively to the second inputs of gates 8A and 8B.

The operation of the circuit may be explained as follows:

Assume first that TxA is nominated as main transmitter by setting switch 17 to the position shown, in which it feeds an enabling signal to input 16A of unit 15. Assume also that the system is quiescent, i.e., no keying signal is applied to terminal 7.

The enabling signal applied to input 16A sets the outputs of unit 15 so that outputs 18A and 19B apply enabling signals to gate 8A, while output 19A applies a blocking signal to gate 8B.

In the absence of a keying signal at terminal 7, the outputs of gates 8A and 8B will both have a value V1. When a keying signal is applied it will be passed by gate 8A but not by 8B. The output of 8A will therefore change to a value V2, while that of 8B will remain at V1.

Transmitters TxA and TxB are arranged to be keyed ON when a signal of value V2 is applied to their respective keying input terminals. Therefore, in the present instance the nominated main transmitter TxA will be keyed on.

Power monitor units 4A and 4B are each arranged to give an output of value V1 when the associated transmitter is delivering RF power at least equal to a specified level and of value V2 when the associated transmitter is keyed OFF or when it is keyed ON but producing an RF power output below the specified level.

OR gate 11A is arranged to pass signals of value V1 applied to either of its inputs but to block signals of value V2.

Prior to the application of the keying signal, transmitter TxA is delivering no RF power and therefore monitor unit 4A gives an output V2 which is blocked by gate 11A. But 11A receives an input V1 from gate 8A, which simulates TxA delivering full power. This signal of value V1 is passed by 11A, via delay unit 12A, to the input of memory unit 13A, setting unit 13A to a condition corresponding to 'TxA serviceable'. In this condition, the output of unit 13A, which is fed to control unit 15, has a value which does not cause any change in control unit 15.

When the keying signal is applied, the input to 11A from gate 8A changes to value V2. But provided that TxA is serviceable, the input to 11A from monitor unit 4A changes to value V1. There is, however, a time interval, at least equal to the transmitter rise time, between the application of the keying signal to TxA and the attaining of full output power. In this interval, both inputs to gate 11A will have value V2, and the gate will give no output.

Delay unit 12A is arranged so that its output is maintained for a time $\delta t$ after the removal of its input signal, and no change of output occurs if the input signal is restored before the expiry of the time $\delta t$. Provided therefore that the output of monitor 4A changes to V1 before the expiry of the delay time, no change occurs in the input to memory unit 13A, which remains in the "TxA serviceable" condition.

If, during a transmission, the RF output of TxA either fails to reach, or falls below, the specified level, the output of monitor 4A assumes the value V2, and no signal passes gate 11A. After the delay time $\delta t$ has elapsed, memory unit 13A is set to a condition corresponding to "TxA failed." Unit 13A includes a feedback loop so arranged that when the unit is set to the "TxA failed" condition consequent on both inputs to gate 11A assuming the value V2, it is locked in that condition and cannot be reset to the "TxA serviceable" condition merely by either of the 11A inputs reverting to the value V1. Unit 13A therefore "remembers" that TxA has failed despite the restoration of the simulated "-transmitter serviceable" signal from gate 8A to gate 11A.

When unit 13A is set to the "TxA failed" condition its output is effective to reset control unit 15 so that outputs 19A and 18B now apply enabling signals to gate 8B and output 19B applies a blocking signal to gate 8A. Keying signals are now passed by gate 8B to TxB but are blocked by gate 8A and prevented from reaching TxA. The stand-by transmitter, TxB, therefore becomes operational.

Prior to the changeover, the output of gate 8B, at level V1, was fed via gate 11B and delay unit 12B to set memory unit 13B to the "TxB serviceable" condition. Provided that TxB delivers the specified output power, unit 13B will be maintained in this condition, in a manner similar to that previously described. If TxB fails, unit 13B will be set to the "TxB failed" condition. Since unit 13A is already in the "TxA failed" condition, a second changeover back to TxA is not initiated. Keying signals continue to be directed to TxB so that, if the failure is not total, information will continue to be transmitted by TxB at an RF power output below the specified level.

As will be described with reference to the more detailed FIG. 2, alarm signals may be derived from the circuit to indicate that:

a. The selected main transmitter has failed and the stand-by transmitter is operational, or b. Both transmitters have failed.

To permit resetting of the system after a fault has been cleared, a switch 23, preferably a push-button switch, is provided which when operated feeds a signal to reset inputs of memory units 13A and 13B, to reset either or both of these units to the "transmitter serviceable" condition.

It will be seen that transmitter TxB may be selected as main transmitter by setting switch 17 to feed an enabling signal to input 16B of control unit 15. The subsequent operation of the circuit will be as described above, with references A, and B interchanged throughout.

Aerial changeover relay 2 may have its operating coil 22 energized via terminal 21 by the output of a gate 20. The inputs of gate 20 are connected to outputs 19A and 18B of control unit 15.

Output 19A controls the routing of keying signals to TxB and therefore provides an enabling input to gate 20 whenever TxB is operational, either as main transmitter or as stand-by after the failure of TxA. Relay 2 is arranged so that the aerial is connected to TxA when coil 22 is de-energized and to TxB when it is energized.

When a changeover from main to stand-by transmitter occurs, the RF output of the newly energized transmitter will not reach its final value until the aerial changeover is completed. The delay time $\delta t$ of delay units 12A and 12B must therefore be greater than the changeover time of the aerial changeover relay. In general the changeover time will exceed the transmitter rise time. Where it is desired that the minimum of information be lost consequent upon a failure of the main transmitter, separate aerials may be provided for the two transmitters, the aerial changeover relay and gate 20 being omitted. This permits $\delta t$ being reduced to a value only slightly exceeding the transmitter rise times, with a consequent reduction in the time taken to complete the changeover.

Further features of memory units 13 and of control unit 15, together with facilities for providing alarm signals, are illustrated in FIG. 2.

In the embodiment to be described with respect to FIG. 2, a positive logic convention (i.e., $+ve$ = logic 1) has been adopted. The gates employed are basically OR gate having inverted outputs. In certain instances they are employed as AND gates in that a logic 1 output is obtained by all the inputs becoming logic 0. In order to provide signals of correct polarity, single-input gates are employed as inverters at various points in the circuit.

In the embodiment to be described, the transmitters are keyed ON by logic 0 and OFF by logic 1 signals applied to their keying input terminals. Power monitor units give outputs of logic 0 when the RF power exceeds a specified level, and logic 1 when the power is less than a specified level.

As before, consider first the case where TxA in nominated as main transmitter, and the system is quiescent, i.e., a logic 1 signal is present at keying input terminal 7.

Switch 17 applies a negative (logic 0) input to gates 51 and 52 in gate unit 15, overriding the logic 1 signal provided via resistor 53.

As will be seen, the second input to gate 51, i.e., input 14A to unit 15, is normally logic 1, maintaining the output of this gate at logic 0 (O/P 18A of unit 15). Since this output is also applied to gate 52, the output of gate 52 (O/P 19A of unit 15) is set to logic 1. This sets gate 8B output to logic 0, irrespective of the other two inputs to gate 8B. The output of gate 8B is inverted by gate 57 and fed as a logic 1 signal via terminal 10 to the keying input of transmitter B. The latter is thus maintained in the OFF condition irrespective of the keying signal applied to terminal 7.

A logic 1 signal is fed via resistor 56 to gates 54 and 55, setting the outputs of these gates to logic 0 (Outputs 18B and 19B respectively).

Gate 8A thus has logic 0 signals applied to its first and second inputs. So long as the keying signal at terminal 7 remains logic 1, the output of 8A is held at logic 0. This is inverted by gate 58 and fed as logic 1 via terminal 9 to the keying input of transmitter A, maintaining the latter in the OFF condition.

The signal from power monitor 4A fed to gate 11A via terminal 5 is therefore logic 1. The logic 0 signal from gate 8A is fed to the second input of gate 11A, setting the output of 11A to logic 1. This is fed to delay unit 12A, which produces an inverted (logic 0) output fed to gate 59 in memory unit 13A. The output of gate 59 is logic 1, and is fed to gate 60, which consequently has an output logic 0 fed back to the second input of gate 59. The output of gate 59 also constitutes input 14A to unit 15.

When transmission is required, the keying signal at terminal 7 becomes logic 0, changing the output of gate 8A to logic 1 and therefore the output of 58 to logic 0, thereby keying on transmitter A.

The second input of gate 11A is also changed to logic 1, but provided that transmitter A provides RF power at least equal to the predetermined level, the signal applied to gate 11A via terminal 5 changes to logic 0. Momentarily, however, before TxA output power rises, both inputs to gate 11A are at logic 1, and the output becomes logic 0. The output of delay unit 12A does not immediately change, and provided that the logic 1 output of gate 11A is restored before the end of the delay period, remains unchanged at logic 0.

At the end of the transmission, terminal 7 reverts to logic 1, and the output of gate 8A to logic 0, thereby applying a logic 0 input to gate 11A, and so simulating a satisfactory power output from transmitter A to maintain the circuit in the condition described in readiness for the next transmission.

During these changes, gate 20 has been receiving a logic 0 input from gate 54 and a logic 1 input from gate 52. The output of gate 20 is therefore logic 0. The aerial changeover relay, driven by gate 20, is so arranged that the aerial is connected to transmitter A.

If, during a transmission, the output of transmitter A falls below the selected level, the signal from power monitor 4A changes to logic 1, resetting the output of gate 11A to logic 0. This, after the delay period, results in the output of delay unit 12A becoming logic 1, which in turn sets the output of gate 59 to logic 0. The output of gate 60 becomes logic 1, and is fed back to the second input of gate 59, latching this gate in the logic 0 output condition.

A subsequent change of the output of delay unit 12A back to logic 0 cannot reset gate 59 because of the feedback via gate 60. Gates 59 and 60 together therefore comprise a memory circuit which remembers that transmitter A has failed.

The output of the memory circuit having become logic 0, gate 51 now has logic 0 applied to both its inputs, causing its output to become logic 1. This applies a blocking signal to gate 8A, setting the output of 8A to logic 0 and preventing the keying signal reaching transmitter A. As explained in the preceding paragraph, the resulting restoration of a logic 0 signal to the input of gate 11A does not cause the output of memory unit 13A to revert to logic 1.

At the same time, gate 51 applies a logic 1 input to gate 52, setting its output to logic 0. This removes the blocking input from gate 8B, so that the keying signal can be passed via gates 8B and 57 to transmitter B, and also applies a logic 0 input to gate 20. Since the other input to this gate is already logic 0, its output becomes logic 1, actuating the aerial changeover relay and transferring the aerial to transmitter B.

It will be apparent that during the whole of the time that gate 8B was blocked, a logic 0 input was applied to gate 11B and that therefore the output of memory unit 13B was logic 1. When transmitter B is keyed on, and gives satisfactory output power, the output of monitor unit 4B will provide a logic 0 input to gate 11B, and the output of memory 13B will remain logic 1, since delay unit 12B will prevent any change during the momentary loss of inputs to gate 11B.

If transmitter B fails to give sufficient output, memory 13B will be reset and latched to give a logic 0 output, in the manner previously described.

Since gate 54 still has a logic 1 input from resistor 56, the output of this gate and therefore the output of gate 55 will not be changed, and the keying signal and the aerial will remain connected to transmitter B.

It will be seen that if transmitter B were nominated as main transmitter, by setting switch 17 to feed a logic 0 input to gates 54 and 55, the operation of the system would be similar to that described.

In the event of a failure of one or both transmitters, memory unit 13A and/or 13B will be locked in the logic 0 output condition. To enable these units to be reset, switch 23 applies a logic 0 signal to gate 59 via diode 61 and to the corresponding gate 62 in memory unit 13B via diode 64. The diodes prevent interaction between the two memory units.

If transmitter A is nominated as main transmitter and is satisfactory, gate 52 will have a logic 1 output, while if transmitter B is nominated and satisfactory, gate 55 will have a logic 1 output. An OR gate 65 driven by these two outputs will have a logic 0 output, and a lamp 66, connected between its output and the positive supply rail, will be lit, whenever the nominated main transmitter is satisfactory.

An urgent alarm signal to indicate that both main and stand-by transmitters have failed may be obtained by making use of the fact that both memory units will have a logic 0 output if and only if both transmitters have failed. Gate 67 has its inputs driven by the outputs of the memory units and gives a logic 1 output, which may be used to energize an alarm, only when both inputs are logic 0.

A non-urgent alarm to indicate that the main transmitter but not the stand-by transmitter is operational may be obtained by connecting an OR gate 68 to the outputs of gates 51 and 54.

Of these two gates, whichever one is associated with the main transmitter will have a logic 0 output while the main transmitter is operational and will change to logic 1 if the transmitter fails, while that associated with the stand-by transmitter will have a logic 0 output. The output of gate 68 will therefore go to logic 0 when the main transmitter fails, irrespective of whether TxA or TxB has been selected as main.

The output of gate 68 will also be logic 0 if both transmitters have failed. To resolve this ambiguity, an AND gate 69 has its inputs connected to the outputs of gates 68 and 67. The output of gate 69 goes to logic 1 when the outputs of gates 68 and 67 are both logic 0, i.e., when the main transmitter has failed but the stand-by has not failed.

The invention is not limited to the particular arrangement described. Equivalent arrangements may employ for example negative-going logic and/or other combinations of gates.

What we claim is:

1. A circuit comprising a pair of intermittent carrier transmitters, each having an output and a control input; first and second power monitors each having an input coupled to said transmitters respectively and an output; first and second gates each having a first input, a second input adapted to receive a keying signal, and an output means coupled to said transmitter control inputs respectively for applying said keying signal thereto; first and second memories each having an input coupled to said monitor outputs respectively, and an output means for supplying a signal indicative of the failure of the respective transmitter, said memories being settable to continue to supply said output signal after the failed transmitter is keyed off; a control circuit having first and second inputs coupled to said memory outputs respectively and two output means coupled to said first gate inputs respectively for supplying an enabling signal to one of said gates at any one time and to said other gate in the event of a failure of the actuated transmitter; and means coupled to said control circuit for initially selecting the enabled transmitter.

2. A circuit as claimed in claim 1 further comprising an antenna relay adapted to be coupled to an antenna, and being coupled to said control circuit and said transmitters, said relay coupling the antenna to the keyed transmitter.

3. A circuit as claimed in claim 1 further comprising means coupled to said control circuit for actuating an alarm in the event of the failure of one of said transmitters.

4. A circuit as claimed in claim 1 further comprising means coupled to said control circuit for actuating an alarm in the event of the failure of both of said transmitters.

* * * * *